United States Patent Office 3,513,196
Patented May 19, 1970

3,513,196
METHOD FOR OBTAINING BROMINATED SALICYLANILIDES
Theodore E. Majewski, Midland, Mich., assignor to The Dow Chemical Company, Midland, Mich., a corporation of Delaware
No Drawing. Continuation-in-part of application Ser. No. 455,617, May 13, 1965. This application Nov. 15, 1967, Ser. No. 683,150
Int. Cl. C07c *103/26*
U.S. Cl. 260—559         2 Claims

ABSTRACT OF THE DISCLOSURE

An alkali metal or ammonium hydroxide is added to the alcoholic reaction medium in which salicylanilide is brominated to 3,4',5-tribromosalicylanilide after reaction is completed in amount sufficient to raise the pH to 1.5 to 6 prior to filtration. The filtration time is thereby reduced by at least 50 percent.

---

This application is a continuation-in-part of U.S. patent application Ser. No. 455,617, filed May 13, 1965, now abandoned.

Background of the invention

The present invention is directed to a new and improved method for the manufacture of brominated salicylanilides and particularly for the manufacture of 3,4',5-tribromosalicylanilide and 3,5-dibromosalicylanilide.

3,4',5-tribromosalicylanilide and 3,5-dibromosalicylanilide have been found to be outstanding bactericides and fungicides and are currently being widely employed in many environments such as cosmetics, soaps, detergents and so forth. The commercially employed product usually contains about 4 percent of the 4',5-dibromosalicylanilide. However, the 4',5-dibromosalicylanilide is not as effective as the other bromosalicylanilides in many environments so that high concentration of this dibromo-product is not desired.

The brominated salicylanilides are now conveniently prepared by the bromination of salicylanilide in a reaction medium such as lower alkanol or a mixture of water and lower alkanol, hereinafter "lower alkanol reaction medium."

The use of a lower alkanol reaction medium is an improvement over the prior aqueous processes for brominating salicylanilide, in that bromination in the former proceeds more rapidly and more completely to give a higher proportion of the desired 3,4',5-tribromosalicylanilide. However, the time heretofore required for the manufacture of the product in a lower alkanol reaction medium has been undesirably long by virtue of time spent in separation and isolation of the desired product. For example, the time required to produce a 750 pound batch of bromosalicylanilide product consisting predominantly of 3,4',5-tribromosalicylanilide by the known methods is about two and one half days. In this period, however, a little over two days is spent in isolating the product from the mother liquor and in washing and filtering the product. The reason for the difficulty in isolating the desired product from the mother liquor appears to be the formation of a minor amount of a gummy byproduct, a reaction product of lower alkanol and bromine. When ethanol is the lower alkanol, this gummy byproduct is dibromoacetaldehyde diethyl acetal,

It appears to hold together the product particles and clogs or partially clogs the filter, thus retarding filtration time. A method of substantially reducing the time required for the filtration of the bromosalicylanilide product would permit a tremendous increase in production with existing facilities. Such an improvement in technique and method would be of utmost importance to the industry in order to provide for the increasing demands for the brominated salicylanilide products.

It is an object of the present invention to provide for an improved method for the manufacture of the mixture of bromosalicylanilides consisting predominantly of 3,4',5-tribromosalicylanilide and 3,5-dibromosalicylanilide wherein a lower alkanol reaction medium is used. It is a further object to provide such a method wherein the period of time required for manufacture is reduced to a minimum. An additional object of the present invention is to provide a method which materially reduces the time heretofore required for the separation, isolation and filtration of the bromosalicylanilides from the lower alkanol medium. A still further object in such a process is the provision of a method wherein the time required for the isolation and filtration of the bromosalicylanilide is reduced over those of conventional lower alkanol reaction medium processes by an amount of greater than 50 percent.

Summary of the invention

In accordance with the present invention, salicylanilide is brominated in a reaction medium comprising a lower alkanol or a mixture of a lower alkanol and water. The bromination is carried out and takes place readily at temperatures of at least 30° C. In a convenient procedure the reaction is carried out at the boiling temperature of the reaction mixture and under reflux. However, in a preferred procedure, the reaction is carried out in the temperature range of from about 30° C. to about 70° C. Under such conditions, the reaction takes place readily with the production of the desired product consisting predominantly of 3,4',5-tribromosalicylanilide and 3,5-dibromosalicylanilide together with small amounts of 4',5-dibromosalicylanilide. There is also formed a minor amount of a gummy byproduct, the reaction product of lower alkanol and bromine, e.g., dibromoacetaldehyde diethyl acetal. The bromosalicylanilide products appear in the reaction mixture as crystalline solid materials. Toward the end of the reaction, there is substantial cessation in the precipitation of these solid products. Usually the reaction is about complete in from 0.5 to 3 hours depending upon the quantity of product being produced, the mechanical size of the equipment, the temperature being employed, the rate of contacting the reactants and the means and facilities for agitation and mixing.

The proportions of the reactants to be employed are not critical, some of the desired product being produced when employing the reactants in any proportions. The reaction consumes the reagents in the proportions of about 3 moles of bromine ($Br_2$) for each mole of salicylanilide. In a convenient method, at least 2 moles of bromine and preferably from 2.7 to 3.2 or to 3.4 moles of bromine are employed with each mole of salicylanilide.

The carrying out of the bromination in a lower alkanol reaction medium is an essential part of the practice of the present invention. The term "lower alkanol" is employed in the present specification and claims to refer to alkanols containing from 1, to 2, to 3 carbon atoms, such as methanol, ethanol, propanol and isopropanol. The aqueous alkanol mixtures to be employed as reaction media in accordance with the present teachings are those containing not in excess of 40 percent by weight of water, and preferably from about 15 to 40 weight percent of water with the remainder being one or more lower alkanols. In such embodiment, it is essential that the water comprise not materially more than about 40 percent by weight of the mixture employed as the reaction medium since such excess materially reduces the yield of the 3,4′,5 - tribromosalicylanilide, 3,5 - dibromosalicylanilide and increases the yields of the 4′,5-dibromosalicylanilide. In preferred procedure, the reaction medium consists of 28 percent water and 72 percent ethanol or methanol.

The amount of the reaction medium to be employed is not critical. However, generally enough medium is employed to provide a pourable suspension or slurry of the final product. In a conventional procedure, the reaction medium is employed in an amount, by weight, equivalent to about five times the amount of salicylanilide starting material. Lesser amounts may be employed with somewhat longer reaction times. Excess amounts may be used without deleterious effect but are undesirable from the standpoint of economy.

Following the contacting of the reactants and the production of the solid brominated salicylanilide product, this product is separated from the reaction mixture by filtration. Prior to such filtration, it is critical and essential in accordance with the present teachings that the reaction mixture which is strongly acid with a pH less than 1 be adjusted to a pH of 1.5 to 6. Thereby the effect of the minor amount of the gummy by-product is overcome, and filtration time is substantially reduced.

It is further critical that such pH conditions be established by the addition of an alkali metal or ammonium hydroxide. In the present specification and claims alkali metal hydroxide represents sodium hydroxide and potassium hydroxide. The filtration of the reaction medium at pH values substantially different from those recited are to be avoided as they materially increase the time required for filtration of the brominated salicylanilide product. The adjustment of the pH can be carried out by the portionwise addition of small amounts of at least one of the indicated hydroxides to the reaction mixture, following the reaction period. However, in a convenient procedure, the hydroxide is employed in the form of an aqueous, or alcoholic, or an aqueous alcoholic solution. The temperature of the reaction mixture at the time of the addition of the alkali metal or ammonium hydroxide is not critical. However, high temperatures may decrease the reliability of pH readings. The exact quantity of alkali metal hydroxide to be employed will vary depending upon the end pH desired in the range of 1.5 to 6, and upon the pH of the reaction mixture following the reaction period. The addition of the hydroxide conveniently is made slowly portionwise, thereby allowing for periodic checks of the pH to determine whether a sufficient quantity of hydroxide has been added.

Subsequent to the addition of the hydroxide, the reaction mixture is filtered to remove the solid brominated salicylanilide products. The reaction mixture thus treated is usually filtered using reduced pressure to facilitate the rate of recovery of the product. However, the reaction mixtures wherein the pH has been adjusted to 1.5 to 6 by the addition of an alkali metal or ammonium hydroxide can be filtered at atmospheric as well as reduced pressure, since the effect of the gummy byproduct has now been overcome.

The following examples are merely illustrative and are not intended to be limiting.

Example 1

Liquid bromine (191.8 grams; 1.2 moles) is added portionwise with stirring to a solution of salicylanilide (84 grams; 0.4 mole) dispersed in 400 milliliters of aqueous 72 percent ethanol during a 2 to 5 minute interval. During the addition of the bromine to the reaction mixture and for two hours thereafter the temperature of the reaction mixture is maintained at from 77 to 84° C. During the addition, the desired brominated salicylanilide is formed and precipitates in the reaction mixture as a crystalline solid. Toward the end of the addition there is substantial cessation in the precipitation of brominated salicylanilide product. Following the reaction period, 240 grams of 20 percent aqueous sodium hydroxide is added to the reaction mixture to bring the mixture to a pH of 4. The reaction mixture is then cooled to room temperature and the pH thereafter is rechecked and found to be about 4. The reaction mixture constituting about 850 milliliters is then filtered on a 3½ inch Buchner funnel under a vacuum of 12 millimeters. The time required to complete the filtration is 4.5 minutes. The filtered product is then dried and found to consist of about 78.74 percent of 3,4′,5-tribromosalicylanilide, about 20.5 percent 3,5-dibromosalicylanilide and approximately 0.76 percent 4′,5-dibromosalicylanilide.

In a further operation, salicylanilide is brominated in aqueous 72 percent ethanol in the manner as described in the preceding paragraph. The quantities of the reactants and reaction medium employed and conditions of reaction are all as described above, except that no adjustment is made in the pH of the reaction mixture. The reaction mixture constituting about 600 milliliters of slurry and having a pH of less than 1 is allowed to cool to 25° C. whereupon it is filtered. Filtration of the reaction mixture on a 3½″ Buchner funnel and with the aid of a vacuum of 12 millimeters absolute pressure requires 20 minutes due to the effect of gummy byproduct, dibromoacetaldehyde diethyl acetal. The filtered product is dried and found to consist of 86.02 percent 3,4′,5-dibromosalicylanilide, 0.48 percent 4′,5-dibromosalicylanilide and 13.5 percent 3,5-dibromosalicylanilide.

Example 2

A series of separate brominations is carried out in aqueous 72 percent ethanol and in aqueous 72 percent methanol in the manner as described in Example 1. In each bromination, the quantities of reagents employed and conditions of reaction are all exactly as described for the first of the experiments in Example 1 except that the reaction mixtures are brought to a series of different pH values prior to filtration. A reaction mixture in the aqueous ethanol and another one in the aqueous methanol are left untreated with alkali metal or ammonium hydroxide to serve as checks. The final pH of the reaction medium, time required for filtration and product yield are all set forth in the following table.

|  | Filtration pH at 25° C. | Filtering time (min.) | Yield (percent based upon salicylanilide) | | Percentage of isomers found in the final product | | |
| --- | --- | --- | --- | --- | --- | --- | --- |
|  |  |  | Grams | Percent | 4′,5-di | 3,5-di | 3,4′,5-tri |
| (a) Reaction conducted aqueous 72 percent ethanol | [1] <1 | 20 | 149.5 | 83.1 | 0.48 | 13.5 | 86.02 |
|  | 2 | 6.75 | 159.5 | 88.6 | 0.72 | 16.0 | 83.28 |
|  | 3 | 6.50 | 166.1 | 92.3 | 0.76 | 18.0 | 81.24 |
|  | 4 | 4.5 | 160.2 | 89.0 | 0.77 | 20.5 | 78.73 |
|  | 5 | 6.25 | 159.1 | 88.4 | 0.62 | 19.5 | 79.88 |
|  | 6 | 6.0 | 156.2 | 86.8 | 0.52 | 16.5 | 82.98 |
|  | 7 | 21.5 | 153.3 | 85.2 | 0.75 | 14.1 | 71.65 |
| (b) Reaction conducted aqueous 72 percent methanol | <1 | 10.5 | 162.6 | 90.33 |  |  |  |
|  | 1.5 | 1 | 175.3 | 97.39 | 1.68 | 14.5 | 83.82 |
|  | 5.5 | 1 | 174.3 | 96.83 | 0.72 | 13.0 | 86.28 |

[1] Untreated reaction mixture.

Example 3

In a large scale example, salicylanilide (250 lbs.; 1.17 moles) is dispersed in ethanol (870 lbs.) and water (300 lbs.) and the resulting dispersion heated to a temperature of 60° C. Thereafter liquid bromine (568 lbs.; approx.

3.5 moles) is added slowly portionwise with stirring to the heated reaction mixture over a one hour period. Following the addition of the bromine, the reaction mixture is maintained at the contacting temperature for one hour. The reaction mixture is then allowed to cool to room temperature whereupon 700 pounds of 20 percent aqueous sodium hydroxide (3.5 moles NaOH) is added slowly portionwise to the reaction mixture. The pH of the reaction mixture following the addition of the sodium hydroxide is 5.5. Following the adjustment of the pH the reaction mixture is filtered with the aid of a pulling vacuum (63.5 cm. of Hg absolute pressure). The filtration time is about 80 minutes.

In the same embodiment, a second batch of brominated salicylanilide products is prepared employing exactly the quantities of reactants and employing exactly the same reaction conditions as employed in the preceding paragraph. However, following the reaction period the pH is not adjusted. The reaction mixture, pH <1, is filtered with the aid of a vacuum (63.5 cm. of Hg). Filtration time is 3 hours.

Example 4

To 170.8 grams (0.8 mole) salicylanilide dispersed in 800 grams of 72 percent ethanol is added 383.6 grams (2.4 moles) of bromine while holding the temperature at 65–70° C. After the addition is complete, the mixture is held for one hour at 65–70° C. The mixture is then cooled to 25° C. The resulting reaction mixture is mixed thoroughly and divided into three 300 milliliter portions prior to filtration under suction on a medium sintered glass 350 milliliter Buchner funnel.

The first 300 milliliter portion is filtered as is. It takes 15.5 minutes for the material to filter. The end point of filtration is taken as the point where the steady flow of liquid at the end of the funnel ceases to be a continuous stream and gives a steady drip of about one drop per second. The second 300 milliliter portion is neutralized with 54 milliliters of concentrated ammonium hydroxide to a pH of 6.4. This portion takes six minutes to filter to the same end point. A third 300 milliliter portion is mixed with 54 milliliters of water to bring its volume to that of the second portion. This portion takes 11 minutes, 50 seconds to filter to the same end point.

What is claimed is:
1. In a method for manufacturing predominantly 3,4',5-tribromosalicylanilide by brominating salicylanilide in a liquid reaction medium of the group consisting of lower alkanol and aqueous lower alkanol containing up to about 40 weight per cent water, thereby providing a difficultly filterable bromosalicylanilide product in high yield along with a minor amount of a gummy byproduct resulting from reaction between said alkanol and bromine, the improvement which comprises adding sodium hydroxide, potassium hydroxide or ammonium hydroxide to the reaction mixture following the reaction period and prior to separation of the bromosalicylanilide by filtration, in an amount sufficient to raise the pH of the reaction mixture to within the range of 1.5 to 6, thereby overcoming the effect of said gummy byproduct and providing a product having a substantially reduced filtration time, and filtering the reaction mixture to separate said bromosalicylanilide.

2. The method of manufacturing predominantly 3,4',5-tribromosalicylanilide which comprises the steps of reacting bromine with salicylanilide in a reaction medium selected from the group consisting of lower alkanol and aqueous lower alkanol containing up to about 40 weight percent water, thereby providing a difficultly filterable bromosalicylanilide product in high yield along with a minor amount of a gummy byproduct resulting from reaction between said alkanol and bromine, adding to the reaction mixture, following the reaction period, sodium hydroxide, potassium hydroxide or ammonium hydroxide in an amount sufficient to raise the pH of the reaction mixture to within the range of 1.5 to 6, thereby overcoming the effect of said gummy byproduct and providing a product having a substantially reduced filtration time, and filtering the reaction mixture to separate said bromosalicylanilide.

References Cited

UNITED STATES PATENTS

| 3,064,048 | 11/1962 | Schramm et al. | 260—559 |
| 2,997,502 | 8/1961 | Mattson | 260—559 |
| 2,967,885 | 1/1961 | Lamberti | 260—559 |

HENRY R. JILES, Primary Examiner

H. I. MOATZ, Assistant Examiner

U.S. Cl. X.R.

260—615